US006703968B2

(12) United States Patent
Baugh

(10) Patent No.: US 6,703,968 B2
(45) Date of Patent: Mar. 9, 2004

(54) SYSTEM AND METHOD FOR MITIGATING CO-CHANNEL INTERFERENCE IN PASSIVE COHERENT LOCATION APPLICATIONS

(75) Inventor: Kevin W. Baugh, Gaithersburg, MD (US)

(73) Assignee: Lockheed Martin Corporation, Gaithersburg, MD (US)

( * ) Notice: Subject to any disclaimer, the term of this patent is extended or adjusted under 35 U.S.C. 154(b) by 0 days.

(21) Appl. No.: 10/137,646

(22) Filed: May 3, 2002

(65) Prior Publication Data

US 2002/0167440 A1 Nov. 14, 2002

Related U.S. Application Data

(60) Provisional application No. 60/288,448, filed on May 4, 2001, and provisional application No. 60/288,451, filed on May 4, 2001.

(51) Int. Cl.[7] .......................... G01S 13/87; G01S 31/02
(52) U.S. Cl. .......................... 342/125; 342/55; 342/453
(58) Field of Search .......................... 342/55, 125, 453, 342/463, 464

(56) References Cited

U.S. PATENT DOCUMENTS

| 3,270,340 A | 8/1966 | Hammack |
| 3,286,263 A | 11/1966 | Hammack |
| 3,573,611 A | 4/1971 | Bergemann et al. .......... 324/57 |
| 3,706,096 A | 12/1972 | Hammack |
| 3,786,509 A | 1/1974 | Applebaum et al. ....... 343/17.1 |
| 3,795,911 A | 3/1974 | Hammack ...................... 343/9 |
| 3,972,000 A | 7/1976 | Desblache et al. .......... 329/105 |
| 4,114,153 A | 9/1978 | Neidell ........................... 343/9 |
| 4,746,924 A * | 5/1988 | Lightfoot ..................... 342/453 |
| 4,994,809 A | 2/1991 | Yung et al. ................. 342/108 |
| 5,192,955 A | 3/1993 | Hoang .......................... 342/80 |
| 5,252,980 A | 10/1993 | Gray et al. ..................... 342/59 |

(List continued on next page.)

FOREIGN PATENT DOCUMENTS

| DE | 38 18 813 C | 6/1999 |
| FR | 2 776 438 A | 9/1999 |

OTHER PUBLICATIONS

Wu et al. "Blind Adaptive Beamforming for Cyclostationary Signals," IEEE Transactions on Signal Processing, vol. 44, No. 11 Nov. 1996.*

(List continued on next page.)

Primary Examiner—Ian J. Lobo
(74) Attorney, Agent, or Firm—Hogan & Hartson L.L.P.

(57) ABSTRACT

A system and method for mitigating co-channel interference is disclosed. A radar system detects targets from received signals at an antenna array. The received signals include direct signals and target signals transmitted from remote transmitters. An antenna array receives the signals. A signal processing system is coupled to the antenna array to perform processing operations on the received signals. The processing system includes a primary cancellation component and a secondary cancellation component. A primary illuminator signal is cancelled from the received signals by the primary cancellation component. An adaptive beam former obtains a secondary illuminator signal from the received signals. A reference regenerator regenerates the secondary illuminator signal. An adaptive cancellation filter removes noise from the secondary illuminator signal. The secondary cancellation component mitigates co-channel interference by canceling the secondary illuminator signal from the received signals.

32 Claims, 4 Drawing Sheets

U.S. PATENT DOCUMENTS

| | | | |
|---|---|---|---|
| 5,280,294 A | 1/1994 | Hammerquist | |
| 5,381,156 A | 1/1995 | Bock et al. | 342/126 |
| 5,451,960 A | 9/1995 | Kastella et al. | 342/59 |
| 3,242,487 A | 3/1996 | Hammack | |
| 5,525,995 A | 6/1996 | Benner | 342/90 |
| 5,604,503 A | 2/1997 | Fowler et al. | 342/378 |
| 5,623,267 A | 4/1997 | Wurman | 342/26 |
| 5,912,640 A | 6/1999 | Bradford et al. | 342/99 |
| 5,943,170 A | 8/1999 | Inbar et al. | 359/561 |
| 5,990,831 A | 11/1999 | McDowell | 342/378 |
| 6,031,879 A | 2/2000 | Pace et al. | 375/316 |
| 6,052,421 A | 4/2000 | Richardson et al. | 375/346 |
| 6,057,877 A | 5/2000 | Limberg | 348/21 |
| 6,133,873 A | 10/2000 | Krasner | 342/357.12 |
| 6,424,290 B1 * | 7/2002 | O'Neil et al. | 342/55 |

OTHER PUBLICATIONS

International Search Report, dated Jan. 27, 2003, for Application No. PCT/US02/14070.

R.F. Ogrodnik; Bistatic Laptop Radar, An Affordable, Silent Radar Alternative; Proceedings of the 1996 IEEE National Radar Conference, Ann Arbor, Michigan; May 13–16, 1996; pp. 369–373.

B. Wardrop, et al.; Bistatic Radar Using Adaptive Digital Beamforming; Merging Technologies For the 90's, Dallas, Texas; May 7–11, 1990; pp. 392–395.

R.F. Ogrodnik; Fusion TechBroad Area Surveillance Exploiting Ambient Signals via Coherent Techniques; Multisensor Fusion and Integration for Intelligent Systems; 1994 IEEE; pp. 421–429.

Joho, Marcel et al., On the Design of the Target–Signal Filter in Adaptive Beamforming, Signal and Information Processing Laboratory, Swiss Federal Institute of Technology Zurich, Switzerland, 1998.

Schwenke, Roger W., Sensitivity Analysis of an Estimator–Correlator for the Detection of Spread Targets with Multiple Discrete Highlights, The Pennsylvania State University, Dec. 2000, pp I–13.

Holt, J.M. et al., MIDAS–W: a workstation–based incoherent scatter radar data acquisition system, Massachusetts Institute of Technology, Jun. 2000, pp 1231–1241.

Martinez, David R., Application of Parallel Processors to Real Time Sensor Array Processing, MIT Lincoln Laboratory, pp. 1–7.

Jianqi, Wu, et al., Researches of a New Kind of Advanced Metric Wave Radar, East of China Research Institute of Electronic Engineering, 1999, pp. 194–197.

* cited by examiner

SYSTEM AND METHOD FOR MITIGATING CO-CHANNEL INTERFERENCE IN PASSIVE COHERENT LOCATION APPLICATIONS

CROSS REFERENCE TO RELATED APPLICATIONS

This application claims benefit of U.S. Provisional Patent Application No. 60/288,448 entitled "System and Method for Co-Channel Interference Mitigation for PCL Applications," filed May 4, 2001, which is hereby incorporated by reference. This application also claims benefit of U.S. Provisional Patent Application No. 60/288,451 entitled "System and Method for Wideband Pre-Detection Signal Processing for PCL Applications," filed May 4, 2001, which is hereby incorporated by reference.

BACKGROUND OF THE INVENTION

1. Field of the Invention

The present invention relates to a passive coherent location ("PCL") radar system and method, and more particularly, to a system and method for mitigating co-channel interference of received signals for PCL radar applications.

2. Discussion of the Related Art

PCL radar systems may be represented by a multistatic radar system. A multistatic radar system has many receivers that are separated from one or more transmitters. The radiated signal from a transmitter arrives at a receiver via two separate paths. One path may be a direct path from the transmitter to the receiver, and the other path may be a target path that includes an indirect path from the transmitter to a target to the receiver. Measurements may include a total path length, or transit time, of the target path signal, the angle of arrival of the target path signal, and the frequency of the direct and target path signals. A difference in frequency may be detected if the target is in motion according to a doppler effect.

Knowledge of the transmitted signal is desirable at the receiver if information is to be extracted from the target path signal. The transmitted frequency is desired to determine the doppler frequency shift. A time or phase reference also is desired if the total scattered path length is to be determined. The frequency reference may be obtained from the direct signal. The time reference also may be obtained from the direct signal provided the distance between the transmitter and the receiver is known.

Multistatic radar may be capable of determining the presence of a target within the coverage of the radar, the location of the target position, and a velocity component, or doppler, relative to the radar. The process of locating the target position may include a measurement of a distance and the angle of arrival. The measurement of distance relative to the receiving site may desire both the angle of arrival at the receiving site and the distance between transmitter and receiver. If the direct signal is available, it may be used as a reference signal to extract the doppler frequency shift.

In PCL radar systems, transmitters may be known as illuminators. Illuminators may be wideband sources of opportunities that include commercial frequency modulated ("FM") broadcast transmitters and/or repeaters, commercial high-definition television ("HDTV") broadcast transmitters and/or repeaters, and the like. Techniques for wideband signal pre-detection processing and co-channel interference mitigation exist. Known approaches include an array of antennas used to receive the source of opportunity to be exploited, such as the primary illuminator, and any other co-channel signals present in the environment.

Co-channel signals may include multipath images of the illuminator signal, delay and Doppler-shifted reflections of the illuminator from targets in the region under surveillance and other distant broadcast sources at the same operating frequency as the primary illuminator. Targets may include aircraft, space launch vehicles and the like. The intent of the co-channel mitigation techniques is to eliminate the undesirable sources from the received antenna outputs, such as the strong direct path and multipath components of the exploited illuminator, while leaving the reflected signals from targets of interest unattenuated. Thus, it is desirable to improve co-channel mitigation techniques to better identify and track targets, and to determine target location, range and velocity.

SUMMARY OF THE INVENTION

Accordingly, embodiments of the present invention are directed to a PCL application and method for signal processing within the PCL application.

Thus, the present invention is directed to a system and method for mitigating co-channel interference. According to an embodiment, a method for mitigating co-channel interference in co-channel signals in a bistatic radar is disclosed. The method includes identifying a primary illuminator signal from a primary illuminator. The primary illuminator signal comprises a frequency modulated carrier at a given frequency. The method also includes regenerating the primary illuminator signal. The method also includes canceling the primary illuminator signal from the co-channel interference signals. The method also includes identifying a secondary illuminator signal from a secondary illuminator. The secondary illuminator signal comprises a frequency modulated carrier at the given frequency. The method also includes regenerating the secondary illuminator signal from the co-channel signals.

According to another embodiment, a method for mitigating co-channel interference is disclosed. The method includes canceling a primary illuminator reference signal. The method also includes canceling a secondary illuminator reference signal.

According to another embodiment, a method for mitigating co-channel interference in a bistatic radar receiving co-channel signals comprising target signals reflected by targets and direct signals transmitted by remote transmitters is disclosed. The method includes receiving the co-channel signals at an antenna coupled to the bistatic radar. The method also includes performing adaptive beam forming to obtain a primary illuminator reference signal. The primary illuminator reference signal is from the direct signals and comprises a frequency modulated carrier at a given frequency. The method also includes regenerating the primary illuminator reference signal from the co-channel interference signals. The method also includes performing adaptive beamforming to obtain a secondary illuminator reference signal. The secondary illuminator reference signal is from the direct signals and comprises a frequency modulated carrier at the given frequency. The method also includes regenerating the secondary illuminator reference signal from the co-channel signal from the co-channel signals. The method also includes canceling the secondary illuminator reference signal from the co-channel interference signals.

According to another embodiment, a system for mitigating co-channel interference is disclosed. The system includes an antenna array to receive signals. The system also includes a primary cancellation component to cancel a primary illuminator reference signal from the received signals. The system also includes a secondary cancellation component to cancel a secondary illuminator reference signal from the received signals.

According to another embodiment, a method for detecting targets by a bistatic radar system using transmitted signals and reflected signals from the targets is disclosed. The method also includes converting the received signals into co-channel signals. The method also includes adaptive beamforming a secondary illuminator signal from the co-channel signals. The method also includes regenerating the secondary illuminator signal. The method also includes canceling the secondary illuminator signal from the co-channel signals and mitigating co-channel interference.

According to another embodiment, a method for mitigating interference in a bistatic radar that receives direct path signals and target path signals transmitted as commercial broadcast signals from remote transmitters is disclosed. The target path signals are reflected off targets such that the target path signals have a doppler shift with reference to the direct path signals. The method includes identifying a secondary illuminator signal within the direct path signals. The method also includes cancelling the secondary illuminator signal from the received signals.

According to another embodiment, a method for mitigating interference in a bistatic radar that receives direct path signals and target path signals transmitted as commercial broadcast signals from remote transmitters is disclosed. The target path signals are reflected off targets such that the target path signals have a doppler shift with reference to the direct path signals. The method includes identifying a secondary illuminator signal within the direct path signals. The method also includes canceling the secondary illuminator signal from the received signals.

Additional features and advantages of the invention will be set forth in the description which follows, and in part will be apparent from the description, or maybe learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide further understanding of the invention and are incorporated in and constitutes a part of this specification, illustrate embodiments of the present invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
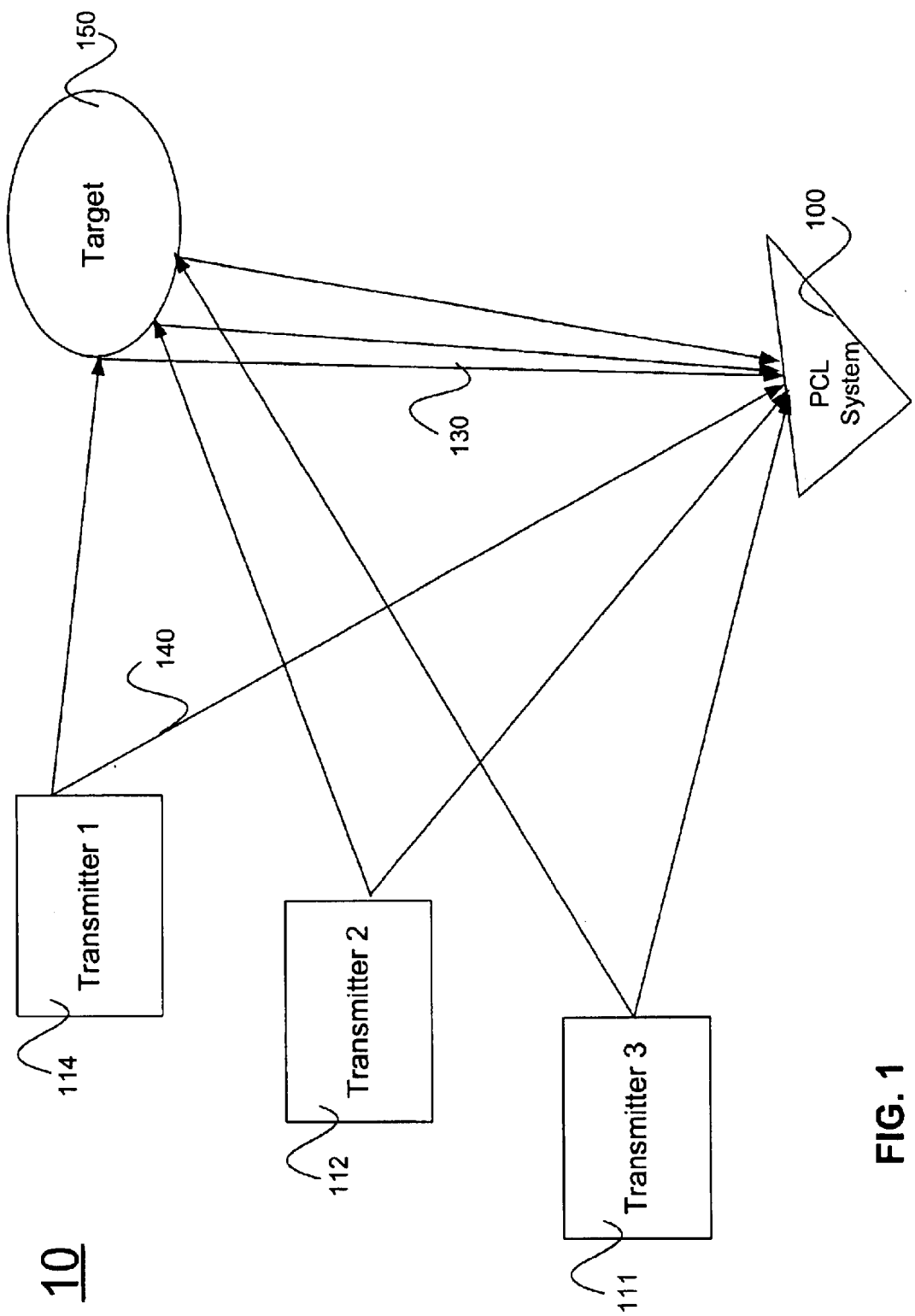
FIG. 1 illustrates a radar detection system including a PCL system, a target, and transmitters in accordance with an embodiment of the present invention.

FIG. 1 depicts radar detection system 10 including a PCL system, one or more targets of interest, and a plurality of transmitters in accordance with an embodiment of the present invention. PCL system 100 represents a family of multi-static wide area moving target surveillance sensors. PCL system 100 exploits continuous wave ("CW") electromagnetic energy, often from sources of opportunity that may be operating for other purposes. Sources of opportunity may include television broadcast stations and FM radio stations. Preferably, PCL system 100 may receive transmissions from a plurality of uncontrolled transmitters such as sources of opportunity, 111, 112, and 114. More preferably transmitters 111, 112, and 114 may be wideband sources of opportunity that include commercial FM broadcast traiismitters and/or repeaters and commercial HDTV TV broadcast transmitters and/or repeaters. Transmitters 111, 112, and 114, however, are limited to these sources of opportunity any may include any device, system or means to transmit uncontrolled signals.

Transmitters 111, 112, and 114 may transmit wideband electromagnetic energy transmissions in all directions. Some of these transmissions are reflected by one or more targets of interest 150 and received by PCL system 100. For example, reflected transmission 140 may be reflected by target 150 and received by PCL system 100. Further, with regard to transmitter 114, reference transmission 130, is received directly by PCL system 100. PCL system 100 may compare reference transmission 130 and reflected transmission 140 to determine positional information about one or more targets of interest 150, as discussed above. Positional information may include any information relating to a position of target 150, including location, velocity, and acceleration, and derived according to processes known to one skilled in the art.

Figure 2:
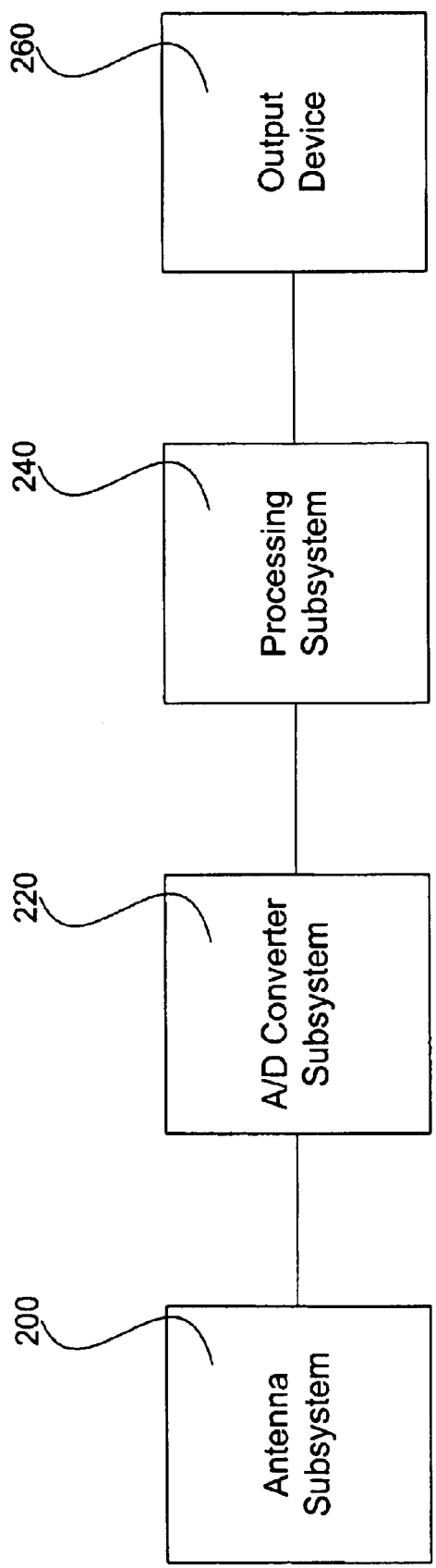
FIG. 2 illustrates a block diagram of a PCL system in accordance with an embodiment of the present invention.

FIG. 2 depicts a block diagram of a PCL system in accordance with an embodiment of the present invention. PCL system 100 may include antenna subsystem 200, ("ADC") analog to digital converter subsystem 220, processing subsystem 240, and output device 260. Antenna subsystem 200 receives electromagnetic energy transmissions, including reflected transmission 130 and reference transmission 140, with at least one antenna. ADC subsystem 220 receives the output of antenna subsystem 200 and outputs digital samples of the signal at its input by sampling the signal at a sampling rate and forming a digital waveform using the magnitude for the analog signal at each sampling interval. Processing subsystem 240 receives the output of assembly subsystem 220 and processes the signal accordingly. Output device 260 receives the processing result and displays the output of processing subsystem 240.

Figure 3:
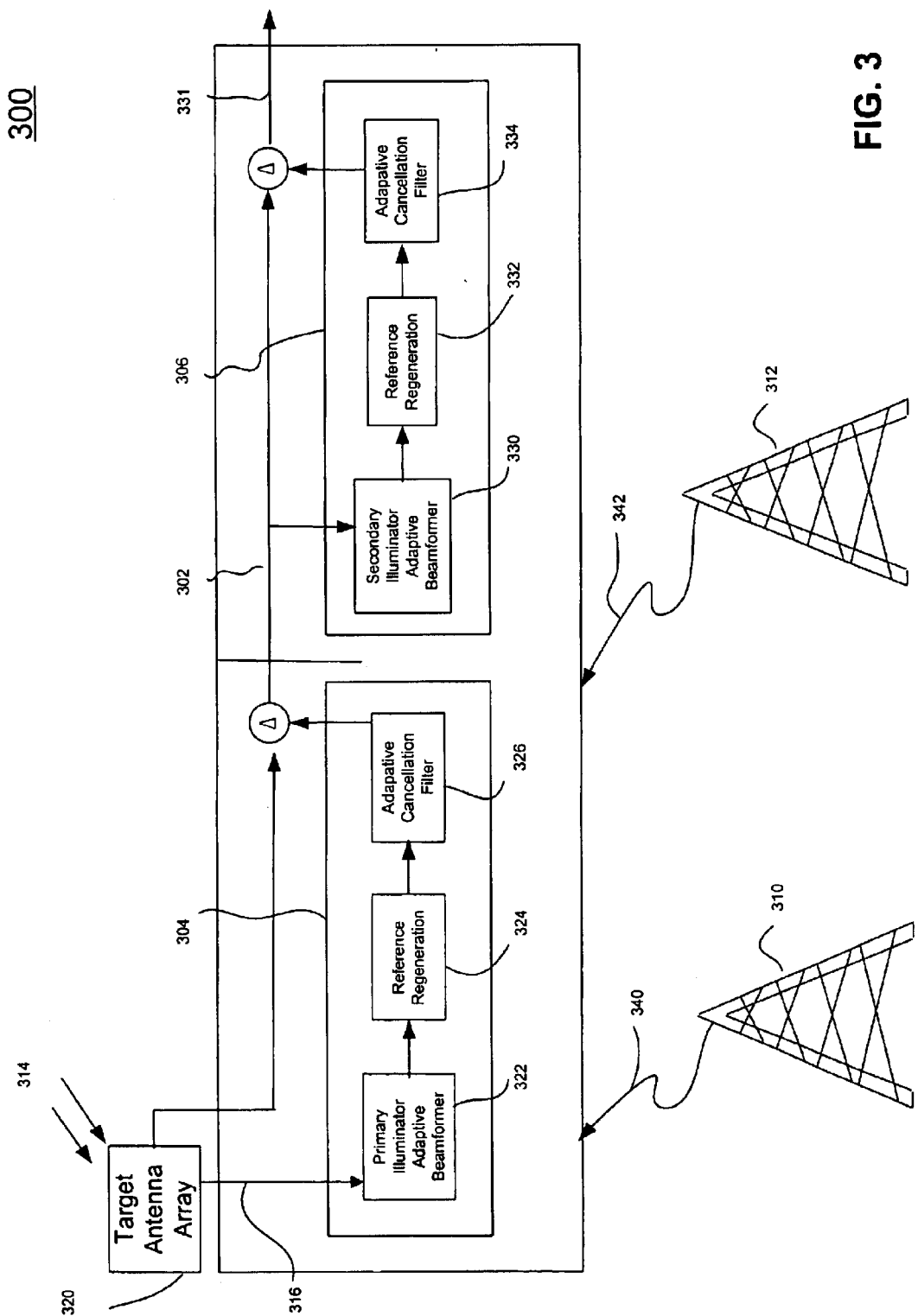
FIG. 3 depicts a signal processing for mitigating co-channel interference system in accordance with the present invention.

FIG. 3 depicts a block diagram of a signal processing system 300 for mitigating co-channel interference in accordance with an embodiment of the present invention. System 300 is configured to mitigate, or reduce, co-channel interference when exploiting wideband sources of opportunity. System 300 is used within a passive coherent location system that detects targets and processes information for the targets, such as time delay, Doppler, angle of arrival, and the like. Wideband sources of opportunity may include commercial FM broadcast transmissions or commercial HDTV TV broadcast transmissions. Thus, FM and HDTV TV broadcast transmitters and/or repeaters may be the illuminators for the PCL system that incorporates system 300.

Referring to FIG. 3, signal processing system 300 receives signals 340 and 342 from transmitters, or illuminators, 310 and 312, respectively. As noted above, signals 340 and 342 preferably may be FM or HDTV signals. Signals 340 and 342 are received by PCL system 100, as depicted in FIGS. 1 and 2. Signal processing system 300 is part of PCL system 100. More particularly, signal processing system 300 may be incorporated into processing sub-system 240. Alternatively, signal processing system 300 may be incorporated into ADC subsystem 220.

Signal processing system 300 includes co-channel mitigation processing system 302. Co-channel mitigation processing system 302 seeks to eliminate the undesirable sources from the received antenna outputs while leaving the reflected signals from targets of interest unattenuated. Co-channel mitigation processing system 302 may be used in conjunction with pre-detection processing within signal processing system 300. Specifically, co-channel mitigation processing system 302 may be used with techniques for wideband pre-detection processing. In these techniques, an array of antennas 320 may be used to receive signals from the source of opportunity to be exploited, such as a primary illuminator and any other co-channel signals present. For example, transmitter 310 may be a primary illuminator that transmits signal 340.

Reflected target signals 314 may be received by antenna array 320. Reflected target signals 314 may be signals correlating to transmitted signals 340 and 342 that have been reflected by a target. Reflected target signals 314 may be compared to transmitted signals to determine target parameters, such as velocity, location, and the like. Target antenna array 320 also may receive any other co-channel signals within the environment with reflected signals 314. Target antenna array 320 then feeds co-channel signals 316 to co-channel mitigation processing system 302. Co-channel signals 316 may reflect the co-channel signals received and to be exploited for PCL operations. These co-channel signals may include multipath images of the illuminator signal, delay, and Doppler shifted reflections of the illuminator from targets in the region under surveillance, such as aircraft or space launch vehicles. The co-channel signals also may include other distant broadcast sources at the same operating frequency as the primary illuminator. Thus, co-channel signals 316 may be a composite of transmitted signals 340 and 342 and reflected signals 314, and may be used as an estimate of these signals. More particularly, the co-channel signals may be a good estimate of the transmitted, or direct, signals because the strong direct path signals dominates the reflected target path signals.

For example, transmitter 310 may be the primary illuminator that operates at a specified frequency and transmitter 312 may be a secondary illuminator operating at the same frequency. Thus, transmitted, or direct, signals 340 and 342 may have the same frequency.

Co-channel mitigation processing system 302 seeks to eliminate the undesirable sources from the received antenna outputs of target antenna array 320 while leaving the reflected signals 314 that are from targets of interest. Reflected signals 314 should be unattenuated. Undesirable sources may include the strong direct-path and multipath components of the exploited illuminator. Co-channel mitigation processing system 302 may include primary cancellation component 304 and secondary cancellation component 306.

Primary cancellation component 304 receives co-channel signals 316. Primary cancellation component 304 includes primary illuminator adaptive beamformer 322, reference regenerator 324, and adaptive cancellation filter 326. Adaptive beamformer 322 may accept co-channel signals 316 and combine them to form signals that have selectivity along specific lines of azimuth and elevation. Adaptive beamformer 322 may enhance desired signals, such as transmitted signals 340 and 342 and reflected signals 314, while suppressing noise and interference received by target antenna array 320. Further, adaptive beamformer 322 may be applied whenever multiple signal sources are present that may be subdivided into target, direct path and noise. Adaptive beamformer 322 may use known methods and applications to amplify and obtain a target or direct path signal while attenuating noise or undesired signals. Preferably, adaptive beamformer 322 is concerned with transmitted signals 340 and 342, which are the direct path signals from transmitters 310 and 312.

Reference regenerator 324 receives the co-channel signals from adaptive beamformer 322 to regenerate direct path signals. Transmitters 310 and 312 may be uncontrolled transmitters in that the users of signal processing system 300 do not have control over transmitters 310 and 312. Reference regenerator 324 identifies those direct path signals from uncontrolled transmitters and reconstructs the signals from processing with the received target signals. A constant amplitude signal estimate having approximately the frequency and phase of the direct path signals may be generated. This signal may be a frequency modulated carrier operating at a given frequency. In reference regenerator 324, the primary direct path signal is regenerated. For example, transmitted signal 340 may be regenerated by reference regenerator 324. Thus, transmitted signal 340 is obtained the various sources of co-channel interference have been reduced by a significant amount.

The co-channel signals with the regenerated primary direct path signal is received by adaptive cancellation filter 326. Cancellation filter 326 serves to clean up the regenerated primary direct path signal prior to cancellation by removing excess energy, such as noise. Cancellation filter 326 removes stray energy collected by target antenna array 320 that is outside of the frequency band of the direct path signal. After filtering, primary cancellation component 304 then cancels the clean, regenerated primary direct path signal from the co-channel signals received by target antenna array 320. Primary cancellation component 304 may reduce the primary illuminator direct path and multipath components, but may still leave significant residual interference from distant co-channel illumination sources in the co-channel signals 316.

After primary cancellation, the remaining co-channel signals are received by secondary cancellation component 306 at secondary illuminator adaptive beamformer 330. Secondary cancellation component 306 also includes reference regenerator 332 and adaptive cancellation filter 334. Adaptive beamformer 330 correlates to adaptive beamformer 322, but they are not necessarily the same. Adaptive beamformers 322 and 330 may have different configurations. Adaptive beamformer 330 serves to perform beamforming on a secondary direct path signal. According to the disclosed embodiments, regulatory constraints on the geographic and spectral distribution of sources of opportunities, or illuminators, may lead to situations where the secondary source of residual co-channel is a distant illumination source operating at the same frequency as the primary illuminator. For example, two transmitters may operate at the same frequency in the FM band, such as two radio stations, and transmit signals oprating at the same given frequency. According to the above disclosed examples, transmitter 312 may be a secondary illuminator transmitting at the same frequency as transmitter 310. Thus, transmitted signal 342 may be a secondary direct path signal operating at the same frequency as transmitted signal 340. Secondary cancellation component 306 cancels the secondary direct path signal much like primary cancellation component 304 cancels the primary direct path signal.

Adaptive beamformer 330 may accept the co-channel signals 316 and combine them to form signals that have selectivity along specific lines of azimuth and elevation. Adaptive beamformer 330 may enhanced desired signals, such as transmitted signal 342 and reflected signals 314, while suppressing noise and interference received by target antenna array 320. Further, adaptive beamformer 330 may be applied whenever multiple signal sources are present that may be subdivided into target, direct path and noise. Adaptive beamformer 330 may use known methods and applications to amplify and obtain a target or direct path signal while attenuating noise or undesired signals, and may be known to one skilled in the art. Preferably, adaptive beamformer 330 is concerned with transmitted signal 342 that is the direct path signal from transmitter 312.

Reference regenerator 332 receives the co-channel signals from adaptive beamformer 330 to regenerate a secondary direct path signal, if applicable. Reference regenerator 332 identifies those direct path signals from uncontrolled secondary transmitters and reconstructs the signals from processing with the received target signals. A constant amplitude signal estimate having approximately the frequency and phase of the secondary direct path signals may be generated. The signal may be a frequency modulated by operating at the same given frequency as the primary direct path signal. In reference regenerator 332, the secondary direct path signal is regenerated. For example, transmitted signal 342 may be regenerated by reference regenerator 332. Thus, transmitted signal 342 is obtained where the various sources of co-channel interference have been reduced by a significant amount.

The co-channel signals with the regenerated secondary direct path signal are received by adaptive cancellation filter 334. Cancellation filter 334 serves to clean up the regenerated secondary direct path signal prior to cancellation. Cancellation filter 334 removes stray energy collected by target antenna array 320 that is outside of the frequency band of the secondary direct path signal. After filtering, secondary cancellation component 304 then cancels the clean, regenerated secondary direct path signal from the co-channel signals received by target antenna array 320. By processing the primary and secondary direct path signals, the primary and secondary illuminator components are reduced without distortion of the desired signals, such as target signals. Thus, co-channel mitigation processing system 302 outputs mitigated co-channel signal 331. Mitigated signal 331 preferably includes target signals without primary and secondary direct path signals. Mitigated signal 331 may be processed by subsequent pre-detection processing components in a more efficient manner without having to account for strong direct path signals. Further, reflected and received target signals may be more accurate in determining target parameters because co-channel interference has been reduced.

Figure 4:
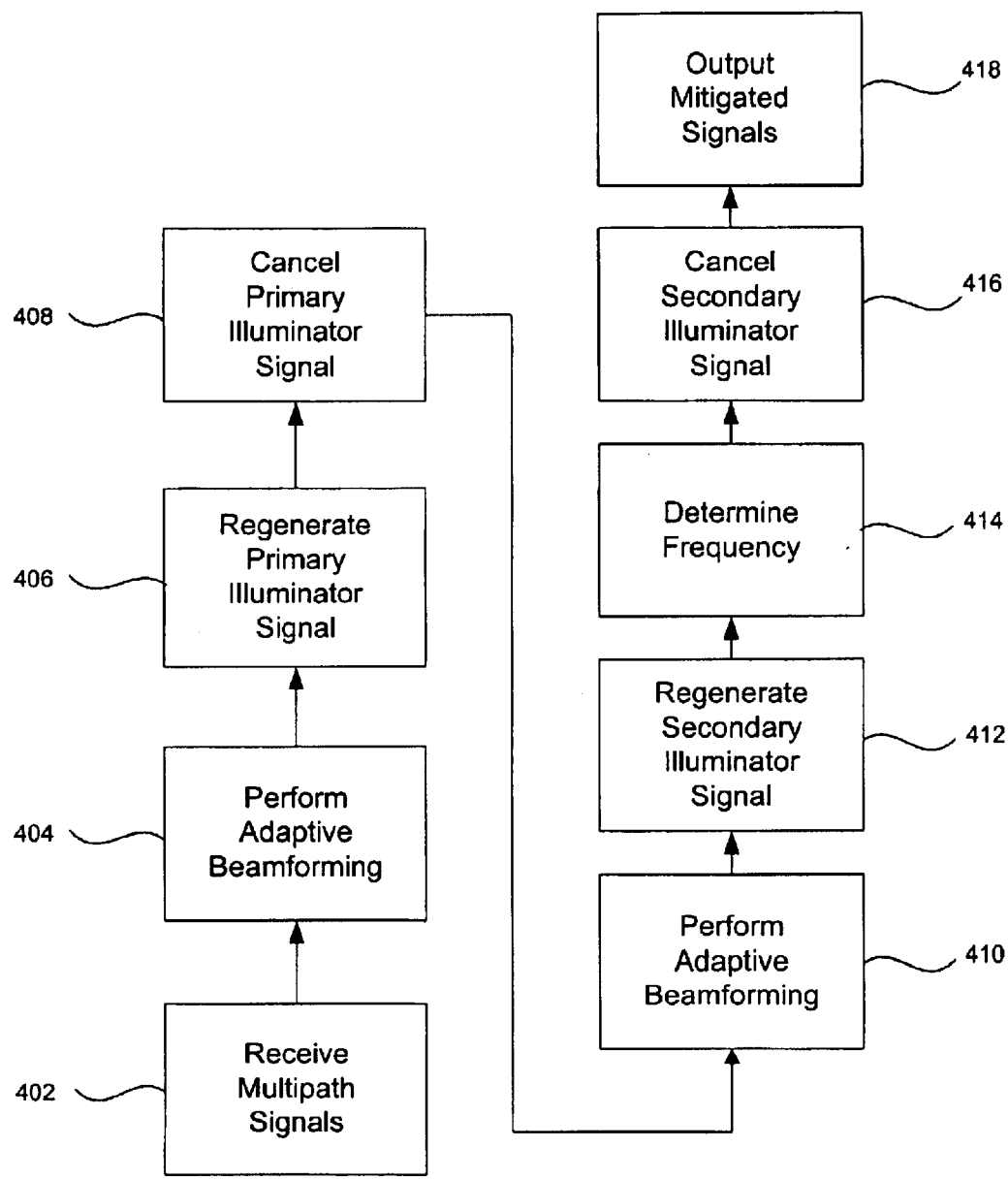
FIG. 4 depicts a flowchart of a system in accordance with the present invention.

FIG. 4 depicts a flowchart for mitigating co-channel interference in accordance with an embodiment of the present invention. Step 402 executes by receiving co-channel, or multipath, signals at a target antenna array. These signals may include direct path signals and reflected target signals, as well as noise and interference signals. Step 404 executes by performing primary adaptive beamforming on the co-channel signals. The primary direct path signal is enhanced for further processing operations. Step 406 executes by regenerating the primary direct path signal. Further, this step may include filtering the primary direct path signal to remove excess energy. Step 408 executes by canceling the primary direct path signal from the co-channel signals.

Step 410 executes by performing secondary adaptive beamforming on the remaining co-channel signals. The secondary direct path signal is enhanced for further processing operations. Step 412 executes by regenerating the secondary direct path signal. Further, this step may include filtering the secondary direct path signal to remove excess energy. Step 414 executes by determining the frequency of the secondary direct path signal. Preferably, the secondary direct path signal has the same frequency as the primary direct path signal. Step 416 executes by canceling the secondary direct path signal from the co-channel signals. Step 418 executes by outputting the mitigated co-channel signals for further signal processing.

It will be apparent to those skilled in the art that various modifications and variations can be made in the disclosed embodiments of the present invention without departing from the spirit or scope of the invention. Thus, it is intended that the present invention covers the modifications and variations of this invention provided that they come within the scope of any claims and their equivalents.

What is claimed is:

1. A method for mitigating co-channel interference in co-channel signals in a bistatic radar, comprising:
   identifying a primary illuminator signal from a primary illuminator, wherein said primary illuminator signal comprises a frequency modulated carrier at a given frequency;
   regenerating said primary illuminator signal;
   canceling said primary illuminator signal from said co-channel signals;
   identifying a secondary illuminator signal from a secondary illuminator, wherein said secondary illuminator signal comprises a frequency modulated carrier at said given frequency;
   regenerating said secondary illuminator signal; and
   canceling said secondary illuminator signal from said co-channel signals.

2. The method of claim 1, further comprising performing adaptive beamforming to obtain said primary illuminator signal.

3. The method of claim 1, further comprising performing adaptive beamforming to obtain said secondary illuminator signal.

4. The method of claim 1, further comprising separating said primary illuminator signal and said secondary illuminator signal from said co-channel signals.

5. The method of claim 1, further comprising receiving said secondary illuminator signal over a greater distance than said primary illuminator signal.

6. The method of claim 1, further comprising receiving said co-channel signals at an antenna array coupled to said bi-static radar.

7. The method of claim 6, wherein said receiving includes receiving said co-channel signals transmitted from remote transmitters including said primary illuminator and said secondary illuminator.

8. The method of claim 6, further comprising transmitting signals as wideband signals from remote transmitters, wherein said signals correlate to said co-channel signals.

9. The method of claim 8, wherein said wideband signals are frequency-modulated broadcast signals.

10. The method of claim 8, wherein said wideband signals are high-definition television broadcast signals.

11. A method for mitigating co-channel interference in a bistatic radar receiving co-channel signals comprising target signals reflected by targets and direct signals transmitted by remote transmitters, comprising:

receiving said co-channel signals at an antenna coupled to said bi-static radar;

performing adaptive beamforming to obtain a primary illuminator reference signal from said direct signals and comprises a frequency modulated carrier at a given frequency;

regenerating said primary illuminator reference;

canceling said primary illuminator reference signal from said co-channel signals;

performing adaptive beamforming to obtain a secondary illuminator reference signal from said direct signals and comprises a frequency modulated carrier at said given frequency;

regenerating said secondary illuminator reference signal; and canceling said secondary illuminator reference signal from said co-channel signals.

12. The method of claim 11, further comprising determining said primary illuminator reference signal is from a primary illuminator of said remote transmitters.

13. The method of claim 11, further comprising determining said secondary illuminator reference signal is from a secondary illuminator of said remote transmitters.

14. A system for mitigating co-channel interference in a bistatic radar system that detects targets from received signals at an antenna, wherein said received signals include direct signals transmitted from remote transmitters and target signals, the co-channel interference mitigation system comprising:

an antenna array to receive signals;

a primary cancellation component to cancel a primary illuminator reference signal from said received signals; and a secondary cancellation component to cancel a secondary illuminator reference signal from said received signals, whereby, the secondary cancellation component comprises:

an adaptive beamformer to obtain a secondary illuminator signal from said received signals, a reference regenerator to regenerate said secondary illuminator signal, and an adaptive cancellation filter to mitigate co-channel interference by canceling said secondary illuminator signal.

15. The system of claim 14, wherein said primary illuminator reference signal and said secondary illuminator reference signal operate at a given frequency.

16. The system of claim 14, wherein said primary cancellation component includes a reference regenerator to obtain said primary illuminator reference signal.

17. The system of claim 16, wherein said primary cancellation component further includes an adaptive beamformer coupled to said antenna array and said reference regenerator.

18. The system of claim 14, wherein said primary cancellation component includes an adaptive cancellation filter.

19. The system of claim 14, wherein said primary illuminator reference signal is received from a primary illuminator and said secondary illuminator reference signal is received from a secondary illuminator.

20. The system of claim 19, wherein said secondary illuminator is located at a greater distance from said antenna array than said primary illuminator.

21. The system of claim 14, wherein said primary illuminator reference signal comprises a direct signal.

22. The system of claim 14, wherein said primary illuminator reference signal comprises a frequency-modulated broadcast signal.

23. The system of claim 14, wherein said primary illuminator reference signal comprises a high-definition television broadcast signal.

24. The system of claim 14, wherein said secondary illuminator reference signal comprises a direct signal.

25. The system of claim 14, wherein said secondary illuminator reference signal comprises a frequency-modulated broadcast signal.

26. The system of claim 14, wherein said secondary illuminator reference signal comprises a high-definition television broadcast signal.

27. A method for detecting targets by a bi-static radar system using transmitted signals from a plurality of remote transmitters, comprising:

receiving said transmitted signals and reflected signals from said targets;

converting said received signals into co-channel signals;

adaptive beamforming a secondary illuminator signal from said co-channel signals;

regenerating said secondary illuminator signal; and canceling said secondary illuminator signal from said co-channel signals and mitigating co-channel interference.

28. The method of claim 27, further comprising canceling a primary illuminator signal from said co-channel signal, wherein said primary illuminator signal comprises the frequency of said secondary illuminator signal.

29. The method radar system of claim 28, wherein said secondary illuminator signal is a direct signal transmitted from a secondary illuminator.

30. A bistatic radar system that detects targets from received signals at an antenna, wherein said received signals include direct signals transmitted from remote transmitters and target signals, comprising:

an adaptive beamformer to obtain a secondary illuminator signal from said received signals;

a reference regenerator to regenerate said secondary illuminator signal; and an adaptive cancellation filter to mitigate co-channel interference by canceling said secondary illuminator signal.

31. The bistatic radar system of claim 30, further comprising co-channel signals generated from said received signals, wherein said secondary illuminator signal is obtained from said co-channel signals.

32. The bistatic radar system of claim 30, further comprising a primary illuminator signal comprising the same frequency as said secondary illuminator signal, wherein said primary illuminator signal is cancelled from said received signals.

* * * * *